United States Patent [19]

Clark et al.

[11] Patent Number: 4,701,936

[45] Date of Patent: Oct. 20, 1987

[54] APPARATUS AND METHOD FOR ADJUSTING THE RECEIVERS OF DATA TRANSMISSION CHANNELS

[75] Inventors: Adrian P. Clark, Loughborough; Sau F. Hau, London, both of England

[73] Assignee: National Research Development Corporation, London, England

[21] Appl. No.: 594,015

[22] Filed: Mar. 27, 1984

[30] Foreign Application Priority Data

Mar. 30, 1983 [GB] United Kingdom ............... 8308843

[51] Int. Cl.$^4$ ...................... H03H 7/30; H03K 5/159
[52] U.S. Cl. ........................................ 375/14; 364/724
[58] Field of Search ............... 375/11, 12, 14; 333/18, 333/28; 364/724

[56] References Cited

U.S. PATENT DOCUMENTS

| | | | |
|---|---|---|---|
| 4,016,410 | 4/1977 | Eggermont | 364/724 |
| 4,356,558 | 10/1982 | Owen et al. | 364/724 |
| 4,489,391 | 12/1984 | Morikawa | 364/724 |

FOREIGN PATENT DOCUMENTS 0121389 10/1986 European Pat. Off. .

OTHER PUBLICATIONS

Rabinev et al "Theory and Application of Digital Signal Processing" Prentical Hall 1975 pp. 84–87.
1974 International Zurich Seminar on Digital Comm. IPC H04 Chpt. 4—Linear and Nonlinear Transversal Equalizers pp. 175–263.
Advanced Data Transmission Systems by A. P. Clark, "Signal Distortion and the Discrete Fourier Transform", 1977, pp. 57–67, and Linear and Nonlinear Transversal Equalizers, pp. 246–267.
The Radio and Electronic Engineer, vol. 51, "Detection Processes for a 9600 bit/s Modem", A. P. Clark et al, pp. 455–465, 1981.
IEEE Transactions on Information Theory, "Adaptive Maximum-Likelihood Sequence Estimation for Digital Signaling in the Presence of Intersymbol Interference", F. R. Magee, Jr. et al, Jan. 1973, pp. 120–124.
Signal Processing 2, "Estimation of the Sampled Impulse-Response of a Channel", A. P. Clark et al, pp. 39–53, 1980.
IEE Proc., vol. 128, Pt. F., No. 1, "Channel Estimation for an HF Radio Link, A. P. Clark et al, Feb. 1981, pp. 33–42.
Clark and Tint "Linear and Non Linear Transversal Equalizers for Baseband Channels". The Radio and Electronic Engineer, vol. 45, No. 6, pp. 271–283, Jun. 1975.
Clark "Design Technique for Non-Linear Equalizers" Proc. IEE, vol. 120, No. 3, pp. 329–333, Mar. 1973.

Primary Examiner—Robert L. Griffin
Assistant Examiner—Stephen Chin
Attorney, Agent, or Firm—Cushman, Darby & Cushman

[57] ABSTRACT

Filters are provided at the outputs of data transmission links to overcome attenuation distortion and phase distortion but such filters tend to increase the noise content of received signals. In the present invention a filter coupled to a linear baseband channel is constrained to be an all pass network, thus avoiding any noise enhancement at its output. The filter is adjusted using a channel estimator and an adjustment system to give the channel plus the filter an impulse-response that rises rapidly to its peak, thus simplifying the detection process needed for a satisfactory tolerance to noise. The required response is obtained by finding those roots (zeros) of the z transform of the sampled impulse-response of the channel, which have a modulus greater than some given value which is not less than unity, and adjusting the filter such that, in the z transform of the sampled impulse-response of the channel and filter, the roots are replaced by the complex conjugates of their reciprocals, the remaining roots of the channel z-transform being left unchanged.

27 Claims, 7 Drawing Figures

APPARATUS AND METHOD FOR ADJUSTING THE RECEIVERS OF DATA TRANSMISSION CHANNELS

BACKGROUND OF THE INVENTION

The present invention relates to apparatus and methods for adjusting filters acting as equalisers or predetection signal processors in receivers for data transmission links such as modems for operation for example over telephone, optical fibre or high frequency radio systems.

When a data transmission system operates by sending a serial stream of signal elements in the form of binary or multi-level pulses, four types of distortion occur: attenuation distortion, phase distortion, noise multiplication and noise addition. A solution which has been used to overcome attenuation and phase distortion uses a linear equaliser whose attenuation versus frequency and phase versus frequency characteristics are the inverse and negative, respectively, of those of the data link. The use of an equaliser with an attenuation characteristic of this type leads to the enhancement of noise at frequencies where relatively high attenuation is introduced by the data link.

Two types of equaliser-detector combinations are commonly used: firstly a linear feed-forward transversal filter followed by a maximum likelihood detector such as a detector using the Viterbi algorithm or else a near maximum likelihood detector such as a reduced state Viterbi algorithm detector; and secondly a non-linear (decision-feedback) equaliser and a simple detector, the non-linear equaliser employing both a feed-forward transversal filter and a feed-back transversal filter. Where either the maximum likelihood detector or equaliser are used the linear feed-forward transversal filter ideally attempts to correct only the phase distortion caused by the data transmission link. The near maximum likelihood detector operates to provide optimum detection, whereas the feed-back filter in the equaliser attempts to provide accurate equalisation of the data transmission link and feed-forward filter in cascade.

The maximum likelihood detector suffers from the disadvantage that it requires too much electrical storage and a large number of operations per symbol transmitted. The non-linear equaliser is sub-optimum, essentially because a received signal element is here detected solely from its first component (at the output of the feed-forward filter) the remaining components being ignored in the detection process.

It has become clear that for most reliable operation of a maximum or near maximum likelihood detector or else of a non-linear equaliser, the feed-forward transversal filter must be adjusted to act as an all pass network which gives a resultant minimum phase response (that is no attenuation occurs at any frequency transmitted).

A gradient method is known for adaptively adjusting the feed-forward filter and providing a sampled impulse-response of the data transmission link and the linear feed-forward transversal filter required for use either by the near maximum likelihood detector or by the feedback transversal filter. This method is satisfactory where the data link has a high signal to noise ratio but unfortunately over poorer telephone circuits where it is most important to achieve the best available tolerance to noise, the degradation in tolerance becomes significant. Furthermore an unduly long training signal is required at the start of transmission for the initial adjustment of the feed-forward transversal filter in an adaptive system. The duration of the training signal can be substantially reduced by using a Kalman filter but only by considerable increase in equipment complexity.

The subjects of distortion in data transmission systems, non-linear equalisers and maximum likelihood detectors are discussed in the book "Advanced Data-Transmission Systems", by A. P. Clark, published by Pentech Press in 1977. The z transform, an essential technique in the present invention, is also discussed.

SUMMARY OF THE INVENTION

According to the first aspect of the present invention there is provided apparatus for use in modifying signals received over a data transmission link to make the signals more susceptible of detection, comprising a substantially all pass filter having a sampled impulse-response with a z transform with first roots (zeros) and sets of second roots (zeros), the sets of second roots respectively approximating to poles coinciding with at least most of any roots (zeros) having moduli greater than a predetermined value which is not greater than 1.5 and not less than unity of the z transform of the sampled impulse-response of a predetermined data transmission link, the first roots (zeros) being at values of z which are the complex-conjugate reciprocals of those of the poles, and there being one first root for each pole.

Such a filter may be used as the linear feed-forward transversal filter to precede a near maximum likelihood detector or as the feed-forward transversal filter in a non-linear (decision-feedback) equaliser.

Preferably, for use with a maximum likelihood detector, the filter has first roots and sets of second roots for all those roots with moduli greater than 1.2, and for use in a non-linear equaliser, for all roots greater than unity. The filter has the advantage that it in effect cancels by means of the said poles any roots which are greater than the predetermined value in the z transform of the sample impulse response of the data transmission link and additionally it provides roots at the said complex conjugate reciprocals so ensuring, that the filter is "all pass", and, when the predetermined value is unity, that it is also mimimum phase. Therefore theoretically no enhancement of noise occurs.

A zero of a z transform (where the latter is expressed as a polynominal in powers of z) is a value of z, for which the given polynomial becomes equal to zero, and a zero is therefore the same as a root of that z transform. A pole of a z transform is a value of z for which the given polynomial becomes infinite, and the z transform now has an infinite number of terms. The sampled impulse response of a practical channel (e.g. data transmission link) normally has, at least for practical purposes, a finite number of terms, so that its z transform has zeros but no poles.

Although practical filters cannot have a z transform with any poles of modulus (absolute value) greater than unity, each of such poles can be approximated to as closely as required by the appropriate set of zeros having the same modulus. The way in which this approximation can be carried out in the present invention is explained below. Thus filters may, for practical purposes, have poles with moduli greater than unity.

A further advantage of the invention is that it operates solely and directly on the estimate of the sampled impulse-response of the channel. This estimate can be obtained much more quickly and accurately than can the corresponding adjustment of the adaptive linear filter by conventional means, and the invention exploits both the time taken to obtain the estimate and its accuracy.

The filter may be regarded as concentrating the energy in the components (samples) of each received signal-element into the earliest components, whose magnitudes therefore rise rapidly to a peak and then decay relatively slowly to zero.

According to a second aspect of the present invention there is provided a method of modifying signals received over a data transmission link to make the signals more susceptible of detection, including determining from an estimate of the sampled impulse-response of a data transmission link, respective quantities representative of at least most of any roots (zeros), having a modulus, greater than a predetermined value which is not greater than 1.5, and not less than unity, of the z transform of the said estimate, and modifying signals received over the said link by employing a process which has a z transform with first roots (zeros) and sets of second roots (zeros), the sets of second roots respectively approximating to poles coinciding with the roots (zeros) represented by the quantities determined, the first roots (zeros) being at values of z which are the complex conjugate reciprocals of those of the poles, and there being one first root for each pole.

Apparatus according to the invention may include means for automatically determining, from an estimate of the sampled impulse-response of a data transmission link, respective quantities representative of roots (zeros), having a modulus greater than the said predetermined value.

Apparatus according to the first aspect of the invention and the means for determining quantities representative of roots may be formed by a programmed computer.

According to a third aspect of the present invention there is provided filter forming apparatus comprising means for automatically determining, from an estimate of the sampled impulse-response of a data transmission link, respective quantities representative of roots (zeros), having a modulus greater than a predetermined value not greater than 1.5 and not less than unity and for forming a filter having a sampled impulse response with a z transform with first roots (zeros) and sets of second roots (zeros), the sets of second roots respectively approximating to poles and coinciding with the roots (zeros) represented by the quantities determined, the first roots (zeros) being at values of z which are the complex conjugate reciprocals of those of the poles, and there being one first root for each pole.

The filter-forming apparatus may form a filter either by filtering signals, that is by forming a filter itself, or by providing information which allows a filter to be set up.

The filter-forming means may determine a quantity which is the negative reciprocal of a first root having a modulus greater than the said predetermined value, from the sampled impulse response of the data transmission link by taking each sample of the response in reverse sequence starting with the last significant sample, forming a new sequence of samples which is given in reversed order by taking each sample in the reversed response in turn and subtracting the product of the previous sample in the new sequence (in reversed order), if any, times a current estimate of the said negative reciprocal, determining a new estimate of the said negative reciprocal by adding to the previous estimate the dividend obtained by dividing the final sample of the new sequence by the correction factor equal to:

$$\Sigma e_h (-\lambda)^{h-1}, \text{ from } h=1 \text{ to } h=g$$

where $e_h$ is the $h^{th}$ sample of the new sequence (in the correct, not reversed, order), $\lambda$ is the current estimate of the said negative reciprocal, and using the new estimate to repeat the above operation of the reversed impulse-response of the said link until the new estimate of the negative reciprocal is substantially the same as the previous estimate.

The filter-forming means may then determine the negative reciprocals, in turn, of further roots by firstly deriving a modified sampled impulse response in which, in effect, roots whose negative reciprocals have been found are cancelled and substituted by roots which are at the complex conjugates of the z values of the said roots, and secondly using the modified response as the sampled impulse-response which is reversed in the procedure for finding the first root.

The modified sampled impulse response may be obtained by taking, in turn and in the correct order, each sample of the sequence obtained when the final estimate of the negative reciprocal of a root is found and adding to it the product of the previous sample (if any) of the said sequence times the complex conjugate of the said final estimate. The final estimate here is the negative reciprocal of the estimate of the corresponding root.

The final modified sampled impulse response obtained when the negative reciprocal of all roots having moduli greater than the predetermined value have been employed, is the response required for use in a near maximum likelihood detector and for setting up the feedback transversal filter used in a non-linear (decision-feedback) equaliser. Thus detectors and feedback transversal filters set up using an impulse response obtained as described above also fall within the ambit of the present invention.

If the filter to be formed by the apparatus of the invention operates by taking samples of received data, successively delaying the samples by the sampling interval, multiplying each undelayed sample and the delayed samples by respective coefficients, and summing the resultant products, the said coefficients may be determined by the following steps:

taking, in turn, each signal of a sequence of signals equal in number to the number of the said coefficients required, the signals of the sequence initially all being zero except the last which is initially one, adding each signal to the product of the previous signal, if any, times and complex-conjugate of one of the negative reciprocals already found to form an intermediate sequence, reversing the order of the intermediate sequence, forming a further sequence by taking each signal in the reversed sequence, in turn, and subtracting the product of the said one negative reciprocal times the previous signal, if any, in the further sequence, repeating the said steps using the negative complex-conjugate reciprocal and negative reciprocal of another root, and using the new sequence generated as the initial sequence for the first step until all roots previously determined have been used, the signals of the final further sequence found being the required coefficients.

In the above procedure for finding coefficients, the sampled impulse-response of a filter with a z transform having a root (zero) which is the complex conjugate of the reciprocal of one of the roots determined is first found, and then the sampled impulse-response of a filter with a z transform additionally having, for practical purposes, a pole at the value of z of the said root (zero). These two steps may be carried out in the reverse of the above order.

The way in which the poles may be approximated by roots will now be described. If a pole occurs at a point in the complex-number plane and a circle with centre at the origin of the plane is considered, together with a number of points on the circle which include the said point and are equally spaced round the circle, then the pole may be approximated by zeros at all the points except the said point. Thus the zeros have equal moduli. The number of zeros required in the set approximating to one pole may typically be eight but where a pole occurs near the unit circle in the complex number plane more zeros are required.

In that part of the procedure for finding coefficients which starts with the reversed intermediate sequence, the accuracy of the approximation increases with the number of signals in each of the intermediate and final sequences.

DETAILED DESCRIPTION OF THE PREFERRED EMBODIMENTS

Figure 1:
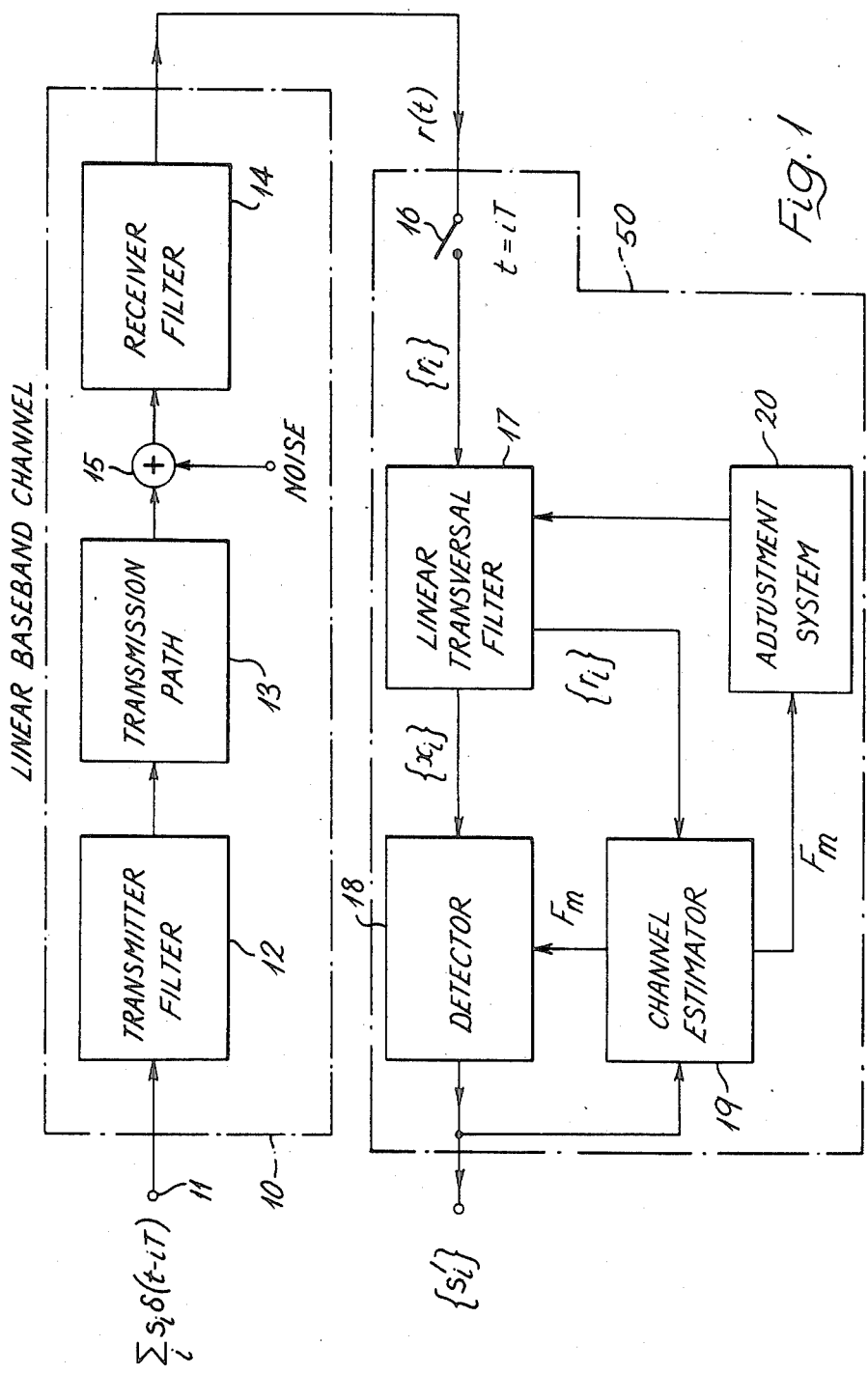
FIG. 1 illustrates a data transmission channel and apparatus for detecting data sent by way of the channel, including apparatus according to the present invention.

In FIG. 1 a data transmission system is represented as a linear baseband channel 10 having an input terminal 11, a transmitter filter 12, a transmission path 13 and a receiver filter 14. The transmission path 13 may for example include a telephone circuit together with a linear modulator at its transmitter and a linear modulator at its receiver, the filters 12 and 14 then including the baseband equivalents operating at the transmitter and receiver, respectively. In FIG. 1 the channel 10 includes the addition at 15 of noise intended to be equivalent to noise occuring between the input terminal 11 and the output of the receiver filter 14.

The data transmission system of FIG. 1 may for example operate at 9.6 or 19.2K bits per second, the transmitted signal being a serial stream of 16 level quadrature amplitude modulated (QAM) signal-elements with a carrier frequency of 1800 Hz and a signal-element rate of 2400 bauds.

The output of the receiver filter is sampled by switching means 16 which is connected to a linear feed-foward transversal filter 17, the purpose of which is discussed later and output signals from the filter are applied to a near maximum likelihood detector 18 which detects data symbols in the received signal. The detection process is under the control of a channel estimator 19 which forms an estimate of the sampled impulse response of the channel 10 and adjusts the detector 18. The estimator 19 supplies the sampled impulse response of the channel 10 to an adjustment system 20 which adjusts the filter 17. The detector 18 may be formed in one of the known ways for example as described by the present inventor and M. J. Fairfield in "Detection Processes for a 9600 bit/s Modem", Radio Electron. Eng., 1981, 51, pp 455–465 or by the above authors and Najdi, H. Y. in "Data Transmission at 19.2K bit/s Over Telephone Circuits", Radio Electron. Eng., 52. The channel estimator may be designed according to the techniques by Magee, F. R. and Proakis, J. G.: "Adaptive Maximum-Likelihood Sequence Estimation for Digital Signalling in the Presence of Intersymbol Interference", IEEE Trans., 1973, IT-19, pp 120–124;

Clark, A. P., Kwong, C. P. and McVerry, F.: "Estimation of the Sampled Impulse-Response of a Channel", Signal Processing, 1980, 2, pp 39–53; and Clark, A. P. and McVerry, F.: "Channel Estimation for an HF Radio Link", IEE Proc., 1981, 128, Pt. F, pp 33–42.

The filter 17 cancels those roots of the z transform of the sampled impulse response of the linear baseband channel 10 which have a modulus greater than some given value which is not less than unity or greater than 1.5, and is typically about 1.2. The filter 17 also adds additional roots which are the complex conjugates of the reciprocals of the roots cancelled. The filter 17 is thus an all-pass network and the z transform of the sampled impulse response of the baseband channel 10, sampler 16 and linear transversal filter 17 in FIG. 1 has no roots with modulus greater than the said given value. As a result, if only one signal element $s_i\delta(t-iT)$ is fed to the baseband channel, a train of non-zero samples are obtained at the output of filter 17, which peak quickly in amplitude and then die away relatively slowly. This is in contrast to the, so called, linear-phase filters which generate a series of samples which commence at low amplitudes, rise to a peak and then fall again symmetrically. Such signals are more difficult to detect because samples due to different transmitted input data symbols are more easily confused with one another.

The operation of the arrangement of FIG. 1 will now be considered on a theoretical basis. The information to be transmitted is carried by the data-symbols $(s_i)$, where $$s_i = s_{0,i} + js_{1,i} \tag{1}$$

and $j=\sqrt{-1}$, $s_{0,i}=\pm 1$ or $\pm 3$, and $s_{1,i}=\pm 1$ or $\pm 3$. It is assumed that $s_i=0$ for $i \leq 0$, so that the impulse $s_i \delta(t-iT)$ is the ith signal-element at the input to the transmitter filter 12. Furthermore, the $(s_i)$ (for $i>0$) are statistically independent and equally likely to have any of their 16 different possible values.

The transmitter filter 12, transmission path 13 and receiver filter 14 together form the linear baseband channel 10 whose impulse response is the complex-valued waveform y(t).

The waveform at the output of the receiver filter 14 is the complex-valued signal $$r(t) = \sum_i s_i y(t - iT) + w(t) \quad (2)$$

where w(t) is the noise waveform originating from the additive noise at the output of the transmission path. The waveform r(t) is sampled by the switching means 16 at the time instants (iT), to give the received samples ($r_i$) which are fed to the adaptive linear transversal filter 17. The sampled impulse-response of the linear baseband channel 10 is given by the (g+1) - component row vector $$Y = [y_0 \ y_1 \ldots y_g] \quad (3)$$

whose z transform is $$Y(z) = y_0 + y_1 z^{-1} + \ldots + y_g z^{-g} \quad (4)$$

where $y_i = y(iT)$ and the ($y_i$) are complex valued. The delay in transmission is neglected here, and, for practical purposes, $y_i = 0$ for $i<0$ and $i>g$. Thus the received sample, at time $t = iT$, is $$r_i = \sum_{h=0}^{g} s_{i-h} y_h + w_i \quad (5)$$

where $r_i = r(iT)$ and $w_i = w(iT)$.

The channel estimator 19 uses the received samples ($r_i$) and the detected data-symbols ($s_i'$), to form an estimate of Y (equation 3). This estimate is then used by the channel estimator to form an estimate $F_m$ of the sampled impulse response of the channel 10 and the filter 17 for both the detector 18 and the adjustment system 20. The ($r_i$) employed in the estimator are delayed by n sampling intervals in the filter 17 and possibly by further sampling intervals in the estimator itself.

Factorizing Y(z) gives $$Y(z) = Y_1(z) Y_2(z) \quad (6)$$

where $$Y_1(z) = (1+\alpha_1 z^{-1})(1+\alpha_2 z^{-1}) \ldots (1+\alpha_{g-m} z^{-1})\eta \quad (7)$$

and $$Y_2(z) = z^{-m}(1+\beta_1 z)(1+\beta_2 z) \ldots (1+\beta_m z) \quad (8)$$

It is assumed here that no roots (zeros) of Y(z) lie exactly on the unit circle in the z plane (a condition normally satisfied in practice). Also $$|\alpha_i| < 1 \text{ and } |\beta_i| < 1 \quad (9)$$

where $\alpha_i$ is the negative of a root of Y(z), $\beta_i$ is the negative of the reciprocal of a root of Y(z), and $\eta$ is the appropriate complex value needed to satisfy equations 6-8, $|\alpha_i|$ and $|\beta_i|$ are the moduli (absolute values) of $\alpha_i$ and $\beta_i$, respectively. In applications where Y(z) has one or more roots on the unit circle, these are taken to be roots of $Y_1(z)$, such that in each case $|\alpha_i| = 1$.

When, according to the invention, the filter 17 is correctly adjusted for the particular case where it replaces all roots outside the unit circle by the complex conjugates of their reciprocals the z transform of its sampled impulse response is approximately $$D(z) = z^{-n} Y_2^{-1}(z) Y_3(z)$$

where $$Y_3(z) = (1+\beta_1^* z^{-1})(1+\beta_2^* z^{-1}) \cdots (1+\beta_m^* z^{-1})$$

and $\beta_i^*$ is the complex conjugate of $\beta_i$. Thus the z transform of the channel and linear filter is approximately $$F(z) = Y(z) D(z)$$
$$= z^{-n} Y_1(z) Y_3(z)$$

It will be seen that the sampled impulse response of the filter D(z) includes two factors: $Y_2^{-1}(z)$ which cancels the factors of equation 8 corresponding to roots outside the unit circle and contains the poles of the filter with z transform D(z); and $Y_3(z)$ which substitutes factors which correspond to the complex conjugates of the reciprocals of these roots. Thus all the roots of F(z) lie inside the unit circle in the z plane and therefore the channel and linear filter together have a response that is minimum phase.

In the provision of a suitable filter 17 according to the invention it is now necessary to find all, or at least most of the roots of the z transform of the channel 10 which lie outside the unit circle and this presents a problem which is solved by the iterative process which is now explained in outline.

A filler is first employed with the z-transform $$A_i(z) = (1+\lambda_i z)^{-1} \quad (13)$$

for $i = 0, 1, \ldots, k$, in turn, and an iterative process is used to adjust $\lambda_i$ so that, as i increases, $\lambda_i \rightarrow \beta_1$ (equation 8). $\beta_1$ is the negative of the reciprocal of the first of the roots of Y(z) to be processed by the system, and, of course, $\beta_1 < 1$. The filter with z-transform $A_i(z)$ does not operate on the received signal in real time (as will be explain later), and therefore its z transform is not limited to zero and negative powers of z. At the end of the iterative process, when $i = k$, the z-transform of the filter is $$A_k(z) \approx (1+\beta_1 z)^{-1} \quad (14)$$

Next a filter is formed with the z-transform $$C_1(z) = (1+\lambda_k z)^{-1}(1+\lambda_k^* z^{-1}) \approx (1+\beta_1 z)^{-1}(1+\beta_1^* z^{-1}) \quad (15)$$

This process is carried out for each $\beta_h$ (h = 1, 2, ..., m). The method of carrying out this process is now explained.

Factorizing equation 4

$$Y(z) = (1+\beta_1 z)(u_0 z^{-1} + u_1 z^{-2} + \ldots + u_{g-1} z^{-g}) \quad (16)$$

where $-1/\beta_1$ is a root (zero) of Y(z) lying outside the unit circle in the z plane. Then $$Y(z) A_i(z) = (1+\beta_1 z)(1+\lambda_i z)^{-1}(U_0 z^{-1} + u_1 z^{-2} + \ldots + u_{g-1} z^{-g}) = (1 + (\beta_1 - \lambda_i) z - \lambda_i (\beta_1 - \lambda_i) z^2 + \lambda_i^2 (\beta_1 - \lambda_i) z^3 - \ldots )(u_0 z^{-1} u_1 z^{-2} - + \ldots + u_{g-1} z^{-g}) \quad (17)$$

But, if $$Y(z)A_i(z) = \ldots + e_{i,-1}z + e_{i,0} + e_{i,1}z^{-1} + \ldots$$
$$+ e_{i,g}z^{-g} \tag{18}$$

the ($e_{i,h}$) for $-\infty < h \leq g$, form the sequence at the output of the filter with z-transform $A_i(z)$, when the sequence Y is fed into it. Since, as previously mentioned, the operation just described is not carried out in real time but on the stored sequence Y (equation 3), there is nothing to prevent the components $e_{i,-1}$, $e_{i,-2}$, ... being nonzero. However, as it happens, these components are never used or even generated in the iterative process, which operates entirely on the sequence of $g+1$ components $e_{i,0}$, $e_{i,1}$, ..., $e_{i,g}$. Now, $$e_{i,0} = u_0(\beta_1 - \lambda_i) - u_1\lambda_i(\beta_1 - \lambda_i) + u_2\lambda_i^2(\beta_1 - \lambda_i) - \ldots$$
$$+ u_{g-1}(-\lambda_i)^{g-1}(\beta_1 - \lambda_i) = (\beta_1 - \lambda_i)(u_0 - u_1\lambda_i + u_2\lambda_i^2 - \ldots + u_{g-1}(-\lambda_i)^{g-1}) \tag{19}$$

$$e_{i,1} = u_0 + (\beta_1 - \lambda_i)(u_1 - u_2\lambda_i + u_3\lambda_i^2 - \ldots + u_{g-1}(-\lambda_i)^{g-2}) \tag{20}$$

$$e_{i,2} = u_1 + (\beta_1 - \lambda_i)(u_2 - u_3\lambda_i + u_4\lambda_i^2 - \ldots + u_{g-1}(-\lambda_i)^{g-3}) \tag{21}$$

and so on. Thus, when $\lambda_i \to \beta_1$, $$e_{i,h} \simeq u_{h-1} \tag{22}$$

for $h = 1, 2, \ldots, g$, and, from equation 19, $$e_{i,0} = (\beta_1 - \lambda_i)\epsilon_i = 0 \tag{23}$$

where $$\epsilon_i = e_{i,1} - e_{i,2}\lambda_i + e_{i,3}\lambda_i^2 - \ldots + e_{i,g}(-\lambda_i)^{g-1} \tag{24}$$

so that $$\beta_1 \simeq \lambda_i + e_{i,0}/\epsilon_i \tag{25}$$

This means that, if c is a positive real constant in the range 0 to 1, then $$\lambda_{i+1} = \lambda_i + ce_{i,0}/\epsilon_i \tag{26}$$

is a better estimate of $\beta_1$ than is $\lambda_i$. Thus a specific iterative process for finding $\lambda_1$ can be based in equation 26.

Figure 2:
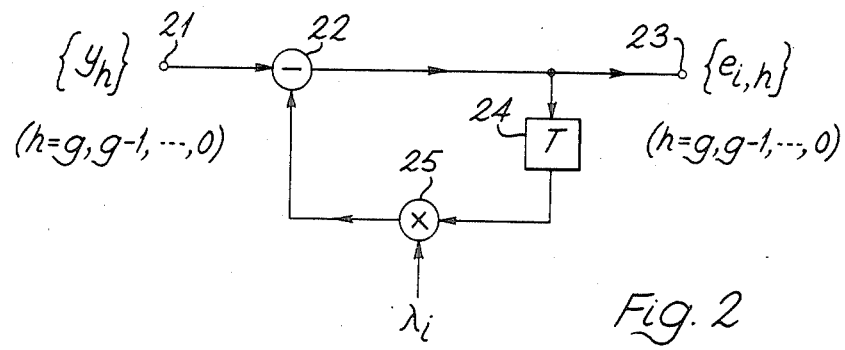
FIG. 2 illustrates a one tap feedback transversal filter which may be used as part of the adjustment system of FIG. 1.
Figure 6:
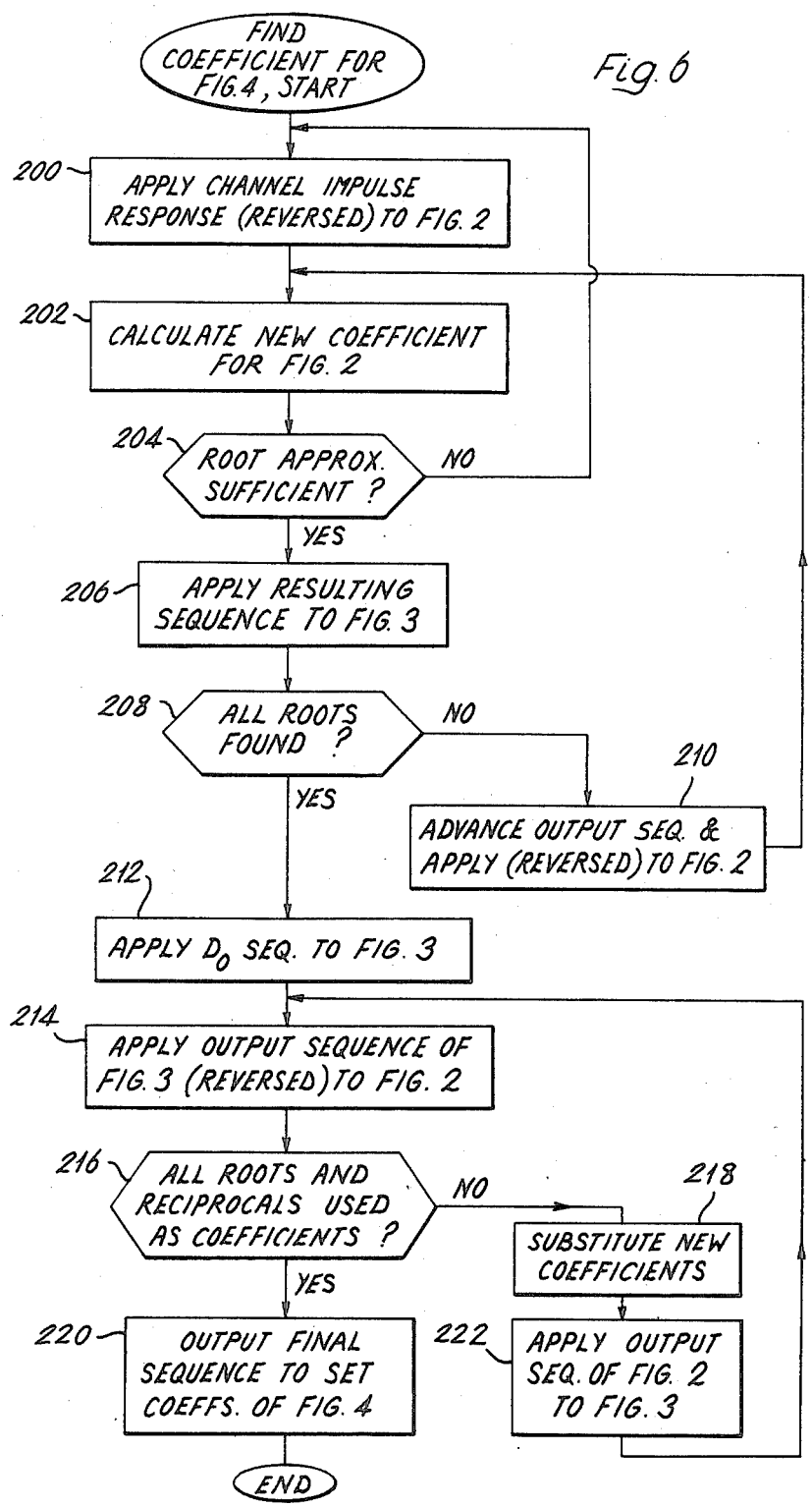
FIG. 6 is a flowchart showing the steps of finding the coefficients for the FIG. 4 filter.

If the filter 17, the detector 18, the channel estimator 19 and the adjustment system 20 are formed by a computer (as indicated by the dashed line 50 in FIG. 1) then the iterative process can be conveniently carried out off line with the help of a single tap feedback transversal filter of the type shown in FIG. 2. This process will be described herein with reference to the flowchart of FIGS. 6 and 7. Sequences applied to an input terminal 21 proceed by way of a substractor 22 to output terminal 23. After substraction a delay 24 is applied and the delayed signals are multiplied at 25 by a coefficient $\lambda_i$ before used by the substractor 22.

The computer holds in store the sequence Y (equation 3) and an estimated $\lambda_i$ of the quantity $\beta_1$ in equation 8, the first estimate of $\beta_1$, at the start of the process, being $\lambda_0 = 0$. The filter of FIG. 2 has the z-transform $$\frac{1}{1 + \lambda_i z^{-1}} = (1 + \lambda_i z^{-1})^{-1} \tag{27}$$

$$= 1 - \lambda_i z^{-1} + \lambda_i^2 z^{-2} - \lambda_i^3 z^{-3} + \ldots$$

which is stable so long as $|\lambda_i| < 1$ and it is always arranged to be so. The stored sequence Y is now reversed in order at step 200, so that it starts with the component $y_g$, and it is fed through the filter of FIG. 2. The sequence Y, passing through the filter in reverse order, is taken to be moving backwards in time, starting with the componently $y_g$, at time $t = gT$, and ending with the component $y_0$, at time $t = 0$. The delay of one sampling interval T in the filter of FIG. 2 now becomes an advance of T, with z-transform z. Thus the effective z transform of the feedback filter becomes $A_i(z)$ in equation 13, and the output signal from the filter is the sequence of the ($e_{i,h}$) in equation 18. Only the $g+1$ components $e_{i,0}$, $e_{i,1}$, ..., $e_{i,g}$ of this sequence are in fact generated. This step is shown at steps 301 and 302.

The computer now calculates $\epsilon_i$ from the output sequence, and by using equation 26 and improved estimate of $\beta_1$ is obtained and $\lambda_i$ is replaced by $\lambda_{i+1}$ at step 202. The effective z transform of this filter, when operating on the sequence Y in reverse order, is now $$A_{i+1}(z) = (1 + \lambda_{i+1}z)^{-1} \tag{28}$$

and the coefficient of $z^{-h}$ in $Y(z)A_{i+1}(z)$ is $e_{i+1,h}$. The constant c in equation 26 is usually set to unity, but for unfavourable channels c may be reduced to 0.5 to enable the system to locate all roots of Y(z) outside the unit circle.

The iterative process continues in the manner described, until the term $e_{i,0}/\epsilon_i$ in equation 26 satisfies $$|e_{i,0}/\epsilon_i|^2 < d \tag{29}$$

where d is an appropriate small positive real constant, or else until either $i = 40$ or $|\lambda_i| > 1$, and in each case the process is terminated. The action taken when $i = 40$ or $|\lambda_i| > 1$ will be considered later. When equation 29 is satisfied, the iterative process is taken to have converged and if the value of i at convergence is k, then $$\lambda_k \simeq \beta_1 \tag{30}$$

Figure 3:
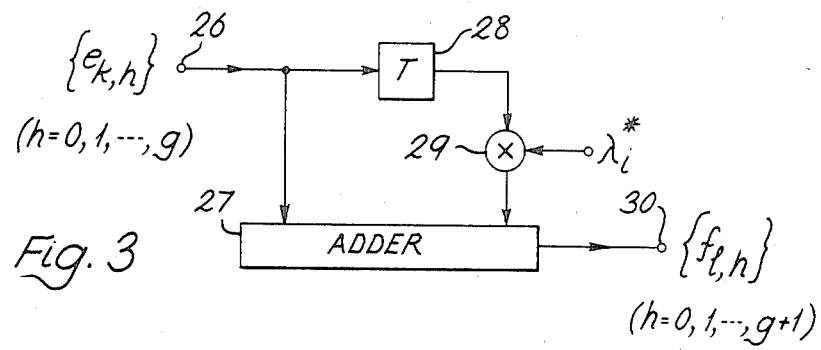
FIG. 3 illustrates a two tap feed-forward transversal filter, which may be used as part of the adjustment system of FIG. 1.

Having found the negative reciprocal of the first root, the sampled impulse response of the channel 10 held in the store is now modified as though it were coupled to a transversal filter with a z transform which cancels the root which has been found. In fact the last output sequence obtained from the filter of FIG. 2 is the response of the baseband channel when the first root has been cancelled, and the effect of adding the complex conjugate of the reciprocal of the root is obtained by using a two tap feed-forward transversal filter which is shown in FIG. 3 as shown at step 206. The final sequence from the output of the filter of FIG. 2 is applied to an input 26 and thence to an adder 27 where samples having experienced a delay 28 of duration T and multiplication 29 by the complex conjugate of the negative reciprocal of the first root are added to provide an output signal at 30. The sequence so formed is the sampled impulse response of a baseband channel plus a filter removing the first root and substituting the complex conjugate of its reciprocal.

The justification for this procedure is as follows. The transversal filter of FIG. 3 has the z-transform $$B_k(z) = 1 + \lambda_k^* z^{-1} \tag{32}$$

The sequence of the $(e_{k,h})$, for $h = 0, 1, \ldots, g$, is now fed through this filter in the correct order, starting with the component $e_{k,0}$, which is taken to occur at time $t=0$. This gives the output sequence of $g+2$ components with z-transform $$f_{1,-1} + f_{1,0}z^{-1} + \ldots + f_{1,g}z^{-g-1}$$

which is approximately equal to $Y(z)A_k(z)B_k(z)$, and where $f_{1,-1} \approx 0$. The resultant effect on the sequence Y of the two filters (FIGS. 2 and 3), giving the sequence of the $(f_{1,h})$, approximates to that of a single filter with z-transform $$C_1(z) = A_k(z)B_k(z) \approx (1 + \beta_1 z)^{-1}(1 + \beta_1^* z^{-1}) \quad (33)$$

as in equation 15. This filter is an allpass network having the same basic properties as the ideal adaptive linear transversal filter with z-transform $D(z)$.

Finally, the output sequence of the $(f_{1,h})$ is advanced by one place (sampling interval) and the first component, $f_{1,-1}$, which is approximately zero, is discarded (step 210), to give the sequence $F_1$, with z-transform $$F_1(z) = f_{1,0} + f_{1,1}z^{-1} + \ldots + f_{1,g}z^{-g} \quad (34)$$

For practical purposes, the linear factor $(1 + \beta_1 z)$ of $Y(z)$, in equation 8, is replaced in $F_1(z)$ by the linear factor $(1 + \beta_1^* z^{-1})$. Thus the root $-1/\beta_1$ of $Y(z)$ is replaced by the root $-\beta_1^*$, which is the complex conjugate of its reciprocal and lies inside the unit circle. $F_1(z)$ contains in addition an advance of one sampling interval. The sequence $F_1$ (with z-transform $F_1(z)$) is an estimate of the sampled impulse-response of the channel and adaptive linear transversal filter 17 (FIG. 1), when the z transform of the latter is $zC_1(z)$ (equation 33).

The sequence with z-transform $F_1(z)$ is now reversed and used in place of the sequence Y as the starting point for finding the negative reciprocal of the next root, the procedures of finding the next negative-reciprocal using the filter of FIG. 2, removing the corresponding root from the z transform of the sequence and substituting for the said root its complex conjugate reciprocal are repeated until the negative reciprocals of all the roots outside the unit circle have been found as shown at steps 208 and 210. At every iteration (repeated cycle of the iterative process), $|\lambda_i|$ is tested to determine whether it is greater than unity. If so, or if i is greater than 40, the iterative process is taken to have diverged and is terminated. The process is then restarted with the first trial negative reciprocal $\lambda_o$ set to the next of its five possible starting values which, including 0 are, in the order of selection, 0, 0.5, $-0.5j$, $0.5j$ and $-0.5$. When all five possible values have been selected and $|\lambda_i| > 1$ or i reaches 40, it is assumed that there are no more roots of $Y(z)$ outside the unit circle. When the channel introduces very severe distortion it may be necessary to use more starting values for $\lambda_o$, for example nine, eight of these being equally spaced on a circle of radius 0.5 in the complex number plane, and the ninth being 0, this again being the first value to be selected.

The final sequence $F_m(z)$ determined when the last root estimate found is used in the filters of FIGS. 2 and 3 is the sampled impulse response of the channel 10 plus the filter 17 and as such it is employed in the maximum likelihood detector in the way described in a paper by Clark, A. P. and Fairfield, M. J., "Detection Processes for a 9600 Bit/s Modem", Radio Electron. Eng., 1981, 51, pages 455-465.

Figure 4:
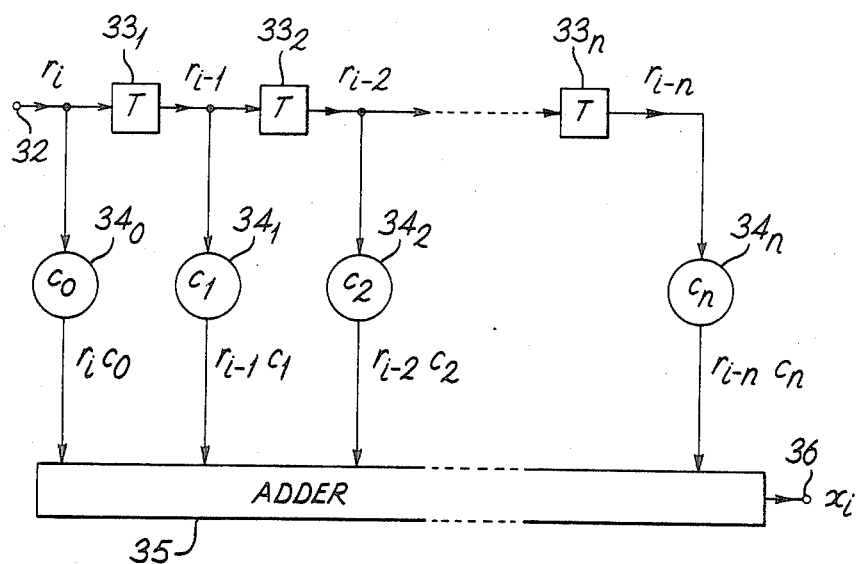
FIG. 4 illustrates a transversal filter which may be used in the linear transversal filter of FIG. 1.

Having obtained all the required negative reciprocals it is now necessary to set up a transversal filter to be used as the filter 17. A suitable filter is shown in FIG. 4 but in practice will usually be formed by the computer rather than in hardware. An input 32 is connected to a series of one sample period delays $33_1$, $33_2$ to $33_g$ which are implemented as stores, and at tapping points at the beginning and end of the sequence of delays and at tapping points between individual delays are connected to respective multipliers $34_0$, $34_1$ to $34_g$. These multipliers multiply their input signals by respective coefficients $c_0$, $c_1$ to $c_n$ (step 304) and their outputs are passed to an adder 35 which has an output 36 (step 306). It is now required to set the above mentioned coefficients to give the transfer function $D(z)$. Since the signals are complex valued, each signal is held in two stores, one for the real part and the other for the imaginary part, and each multiplication involves four multiplication operations. In the adder, all real parts are added, as are all imaginary parts, to give the complex-valued signal $x_i$ at the output.

If all the coefficients in FIG. 4 are set to zero except the last which is set to unity the initial z transform of the filter is $$D_0(z) = z^{-n}$$

and the initial z transform of the channel and filters is $z^{-n}Y(z)$. The sequence $D_0$ with $n+1$ components comprising all zeros except the last component which is a one, is fed through the filter of FIG. 3 at step 212 (with $\lambda_i^*$ set to the complex conjugate of the first negative reciprocal determined) starting with the first component of $D_0$ to give an output sequence with $n+2$ components and the z transform $D_0(z)B_k(z)$.

This latter sequence is now fed at step 214 in reverse order starting with the last component to the filter of FIG. 2 (with $\lambda_i$ set to the first negative reciprocal determined) whose effective transform is $A_k(z)$ to give the output sequence with a z transform which is approximately $$D_0(z)C_1(z) = D_0(z)A_k(z)B_k(z).$$

When $n+1$ components of the output sequence have been obtained the process is halted and these components in the order in which they are received are the coefficients of $z^{-n-1}$, $z^{-n}$, $\ldots$, $z^{-1}$ in $D_0(z)C_1(z)$. The tap gain of the hth tap (that is corresponding to the coefficient $C_h$) of the filter of FIG. 4 is now set to the coefficient of $z^{-h}$, for $h = 1, 2, \ldots, n+1$. The hth tap of the filter is associated with a delay of $h-1$ sampling intervals, whose z transform is $z^{-h+1}$. Thus the z transform of the filter of FIG. 4 is approximately $$D_1(z) = zD_0(z)C_1(z) \quad (38)$$

Since the sequence fed the filter of FIG. 2 is finite, the filter of FIG. 4 now has a z transform with a set of roots which approximate to a pole coinciding with the first root in the z transform of the channel 10 which lies outside the unit circle, and this root in turn is given by the negative reciprocal of $\beta_1$. At this stage the filter of FIG. 4 has another root at the complex conjugate of the reciprocal value at which the pole is located.

Figure 7:
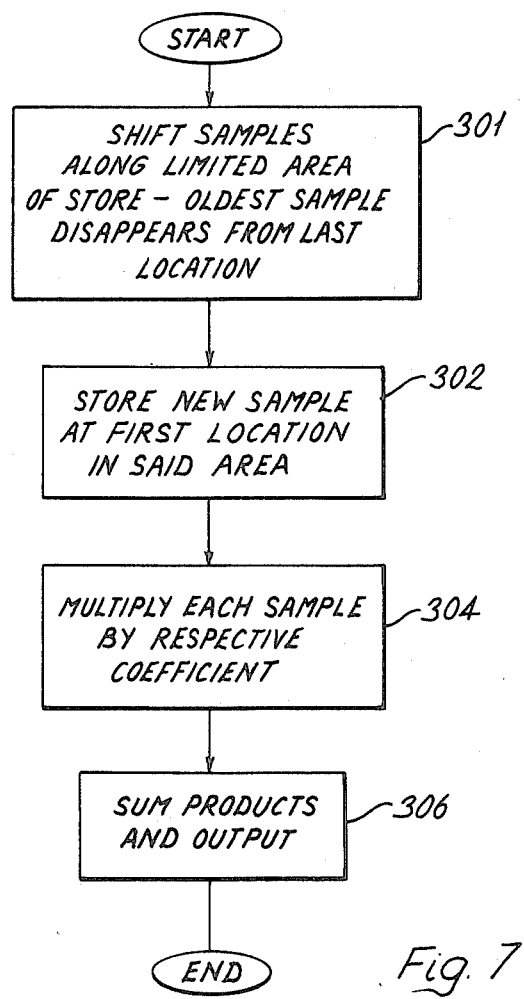
FIG. 7 is a summary flowchart of FIG. 6.

The procedure is repeated using the sequence obtained from the filter of FIG. 2 as the starting sequence which is passed through the filter of FIG. 3 and the resultant sequence passed in reverse order through the filter of FIG. 2 but with $\lambda_1$ equal to the second negative reciprocal determined and $\lambda^*_i$ equal to its complex conjugate (step 218). This process continues until all the values of the roots which have been determined have been used in the filter of FIG. 2 at step 216, when the resulting sequence corresponds to the coefficients $c_0$ to $c_n$ required for the filter of FIG. 4 shown at step 220. FIG. 7 shows a summary of the above process.

The iterative process mentioned above has been stated to operate on all roots of $Y(z)$ that lie outside the unit circle. However it is clear from equations 15 and 27 that, if there are one or more roots of $Y(z)$ only just outside the unit circle, an excessive number of taps are required in the transversal filter 17 in order to achieve the required accuracy of adjustment of the adaptive system.

In the case of an adaptive non-linear equalizer as many as possible of the roots of $Y(z)$ that lie outside the unit circle should be processed by the system, since otherwise there will be a needless reduction in tolerance to additive noise. However, in the case of a near-maximum-likelihood detector it is in fact only necessary to process those roots of $Y(z)$ that lie further away from the unit circle. It is most unlikely that any very useful advantage would be gained here by processing roots whose absolute values are less than 1.1, and, with a well-designed detector, roots with absolute values as high as 1.3 or even 1.5 can be left unprocessed by the system without significantly degrading the performance of the detector. This not only reduces the number of roots to be processed, and hence the total number of iterations involved, but also reduces the number of taps required in the adaptive filter. However, the more roots of $Y(z)$ that are processed by the adaptive system, the simpler becomes the detector that achieves near-maximum-likelihood detection, so that clearly a compromise must be reached between the complexity of the adaptive system and the complexity of the detector.

It is evident from equations 16 to 26 that the closer $\lambda_i$ approaches to $\beta_h$, the greater the improvement in the accuracy of $\lambda_{i+1}$ over that of $\lambda_i$, so that the rate of convergence of the iterative process increases as $\lambda_i \rightarrow \beta_h$. When $\lambda_i$ differs considerably from all ($\beta_h$), the rate of convergence of the iterative process tends to be slow, particularly when $Y(z)$ has several roots outside the unit circle. A modification to the standard algorithm just described may then be used as is aimed at improving the initial rate of convergence of the iterative process when there are many roots of $Y(z)$ outside the unit circle.

The process as before, except that the values ascribed to $\lambda_1$, $\lambda_2$, $\lambda_3$ and $\lambda_4$ (and for severe channel distortion more estimates for example $\lambda_5$ and $\lambda_6$) in any of the iterative processes, instead of being given by equation 26, are as follows:

$$\lambda_{i+1} = \frac{i+1}{i+2\lambda_i} + \frac{1}{i+2}(e_{i,0}/\epsilon_i) \quad (42)$$

for i=0, 1, 2 and 3. It can be seen from equation 42 that $$\lambda_4 = \frac{1}{5}\left(\lambda_0 + \sum_{i=0}^{3} e_{i,0}/\epsilon_i\right) \quad (43)$$

but, of course, the values of the $(e_{i,h})$ and $(\epsilon_i)$ are not the same as those given by the first mentioned algorithms based on equations 22 to 24. If during the generation of $\lambda_1$ to $\lambda_4$ as just described, $$|e_{i,0}/\epsilon_i|^2 < 0.01 \quad (44)$$

the modified algorithm is immediately replaced by the first mentioned algorithm. As before, if at any time $|\lambda_i| > 1$ (or, of course, when i reaches 40), the iterative process is terminated and then restarted with $\lambda_0$ set to the next of its five possible values.

The modified algorithm progressively reduces the change from $\lambda_i$ to $\lambda_{i+1}$, as i increases from 0 to 3, and thereby appears to guide $\lambda_i$ more reliably towards a value of $B_h$ when $Y(z)$ has many roots outside the unit circle. Of course other versions of the modified algorithm are possible and may have uses in other circumstances.

Figure 5:
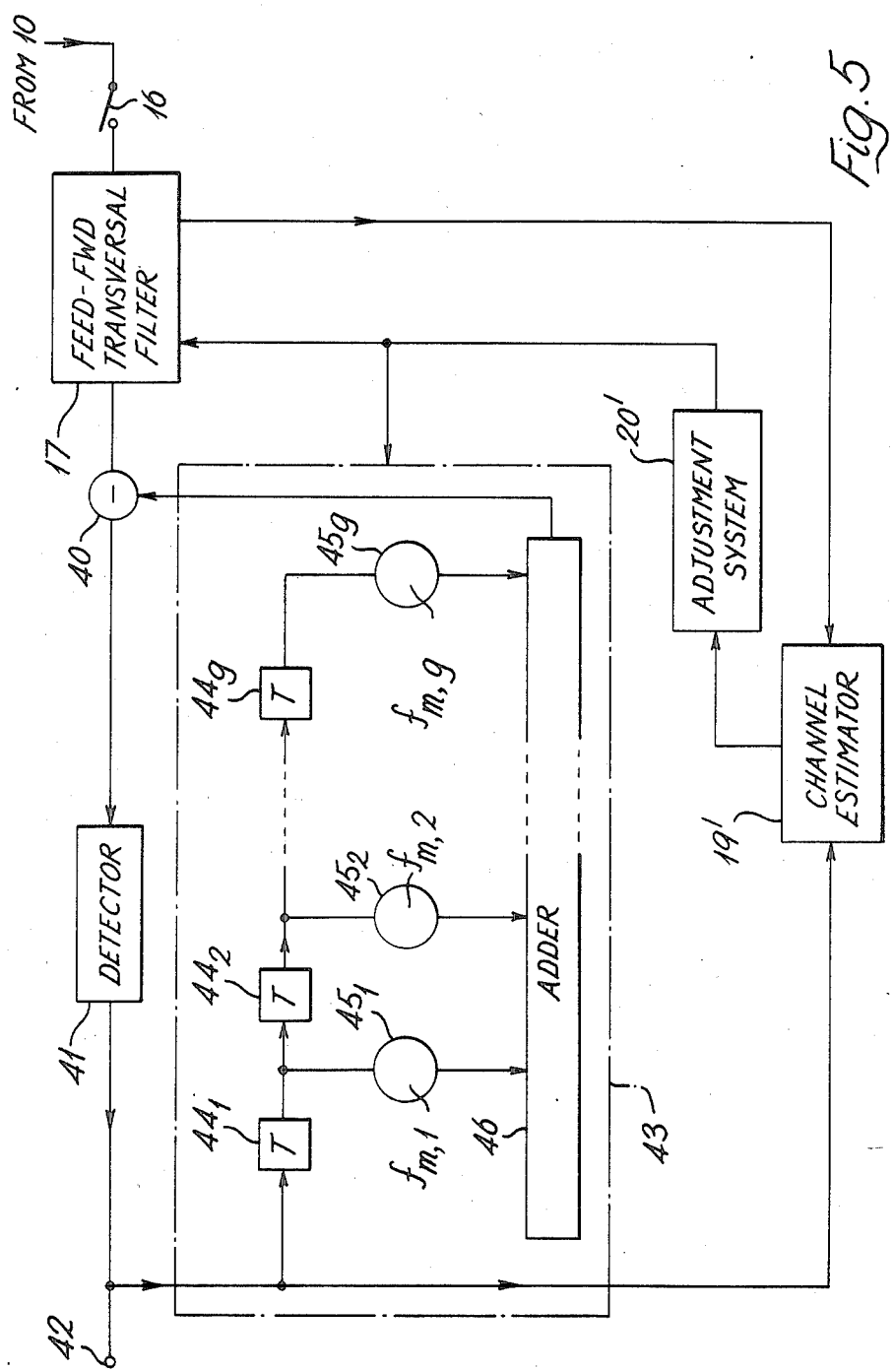
FIG. 5 illustrates a non-linear equaliser, including apparatus according to the invention, and a detector

The application of the invention to a non-linear equaliser is now described. In FIG. 5 data from the channel 10 of FIG. 1 is passed to the switching means 16 and the feed-forward transversal filter 17 which are identical to those of FIG. 1. After passing through a subtraction circuit 40 signals from the filter 17 reach a detector circuit 41 which may be a simple threshold detector having an output terminal 42. The detector output is fed back to the subtraction circuit 40 through a feed-forward tranversal filter 43 which is thus connected as a feed-back filter. The filter 43 has one-sample period delays $44_1$, $44_2$ to $44_g$, multipliers $45_1$, $45_2$ to $45_g$ and an addition circuit 46, arranged as shown. A channel estimator 19' forms an estimate of the resultant sampled impulse-response of the channel 10 and the filter 17 and supplies information for the adjustment system 20' to calculate the coefficients for the filter 17 and the filter 43. The latter coefficients are, in turn, the second, third, ..., (g+1)th components of the final estimate of the sampled impulse response of the channel 10 and filter 17 in cascade as given by $F_m(z)$. As with the arrangement of FIG. 1, most of, and usually all, the components shown in FIG. 5 are in practice usually formed by a programmed computer.

In operation as part of a modem the apparatus of FIGS. 1 and 5 first receives a test signal which enables the channel estimator 19 or 19' to form the z-transform $Y(z)$. In a period of the order of 10 milliseconds the channel estimator determines the coefficients for the filter 17 (and the filter 43) and the receiver is ready for the data signal. During further operation the estimator continually estimates the impulse response from signals received and continually updates the coefficients for the filter 17 (and the filter 43), starting each time with the roots that were previously determined.

The transmission path shown in FIG. 1 may take any of several forms, for example a telephone line, an optical fibre or an h.f. radio link. The filters 17 and 43 may take other forms such as lattice networks or analogue filters.

The invention may also be applied in the storage of data on, for example, tape and discs where the packing density can be increased. In this case the data transmission link of the invention is envisaged as including the storage of data.

What is claimed is:

1. Apparatus for use in modifying signals received over a data transmission link to make the signals more susceptible of detection, the apparatus being, in operation, coupled to the data transmission link by way of means for generating samples of the output signals of the link at successive times, and the apparatus comprising:

means for providing an estimate of the sampled impulse response of said data transmission link;

a substantially all-pass filter, formed using said estimate, the filter having a sampled impulse-response with a z transform with first roots (zeros), and sets of second roots (zeros), the sets of second roots respectively approximating to poles coinciding with at least most of any roots (zeros) having moduli greater than a predetermined value which is not greater than 1.5 and not less than unity of the z transform of the sampled impulse-response of the predetermined data transmission link, the first roots (zeros) being at values of z which are the complex conjugate reciprocals of those of the said poles and there being one first root for each pole.

2. Apparatus according to claim 1 wherein the predetermined value is 1.3.

3. Apparatus according to claim 1 in combination with means for sampling, at regular intervals, signals received over a data transmission link, and
a detector,
the filter being coupled between the sampling means and the detector.

4. Apparatus according to claim 1 wherein said filter comprises means for taking samples of received data, means for successively delaying the samples by the sampling interval, means for multiplying each undelayed sample and the delayed samples by respective coefficients, and means for summing the resultant products, the said coefficients being determined in accordance with the negative complex-conjugate reciprocals and negative reciprocals of the roots found.

5. Apparatus according to claim 3 wherein the filter, the sampling means and the detector are formed at least in part by a programmed computer.

6. A method of modifying signals received over a data transmission link to make the signals more susceptible of detection, including determining from an estimate of the sample impulse-response of a data transmission link, respective quantities representative of at least most of any roots (zeros), having a modulus greater than a predetermined value which is not greater than 1.5, and not less than unity of the z transform of the said estimate, and
modifying signals received over the said link by employing a process which uses a z transform with first roots (zeros) and sets of second roots (zeros), the sets of second roots respectively approximating to poles coinciding with the roots (zeros) represented by the quantities determined, the signal modification being constrained to be all-pass by providing one first root for each pole, and by locating the first roots (zeros) at values of z which are the complex conjugate reciprocals of those of the said poles.

7. A method according to claim 6 wherein the respective quantities are found sequentially.

8. A method according to claim 6 wherein a quantity which is the negative reciprocal of a first root having a modulus greater than the said predetermined value, is determined from an estimate of the sampled impulse-response of the data transmission link by taking each sample of the response in reverse sequence starting with the last significant sample,
forming, in reversed order, a new sequence of samples by taking each sample in the reversed response in turn and subtracting the product of the previous sample in the new sequence (in reversed order), if any, times a current estimate of the said negative reciprocal,
determining a new estimate of the said negative reciprocal by adding to the previous estimate a number proportional to the dividend obtained by dividing the final sample of the new sequence by a correction factor, and
using the new estimate to repeat the above operation of the reversed impulse-response of the said link until the new estimate of the negative reciprocal is substantially the same as the previous estimate.

9. A method according to claim 8 wherein after determining the negative reciprocal of the first root, the negative reciprocals, in turn, of further roots are determined by firstly deriving a modified sampled impulse response in which, in effect, roots whose negative reciprocals have been found are cancelled and substituted by roots which are at the complex conjugate reciprocals of the z values of the said roots, and
secondly using the modified response as the sampled impulse-response which is reversed in the procedure for finding the first root.

10. A method according to claim 8 wherein the said correction factor is equal to:

$$\Sigma e_h (-\lambda)^{h-1}, \text{ from } h=1 \text{ to } h=g$$

where $e_h$ is the $h^{th}$ sample of the new sequence (in the correct, not reversed, order) and $\lambda$ is the current estimate of the said negative reciprocal.

11. A method according to claim 6 wherein the said process operates by taking samples of received data, successively delaying the samples by the sampling interval, multiplying each undelayed sample and the delayed samples by respective coefficients, and summing the resultant products, the said coefficients being determined in accordance with the negative complex-conjugate reciprocals and negative reciprocals of the roots found.

12. A method according to claim 11 wherein the coefficients are found by taking, in turn, each signal of a sequence of signals equal in number to the number of the said coefficients required, the signals of the sequence initially all being zero except the last which is initially one, adding each signal to the product of the previous signal, if any, times the complex-conjugate of one of the negative reciprocals already found to form an intermediate sequence,
reversing the order of the intermediate sequence,
forming a further sequence by taking each signal in the reversed sequence, in turn, and subtracting the product of the said one negative reciprocal times the previous signal, if any, in the further sequence, repeating the said steps using the negative complex-conjugate reciprocal and negative reciprocal of another root, and using the new sequence generated as the initial sequence for the first step until all roots previously determined have been used, the signals of the final further sequence found being the required coefficients.

13. Filter forming apparatus comprising means for automatically determining, from an estimate of the sampled impulse-response of a data transmission link, respective quantities representative of roots (zeros), having a modulus greater than a predetermined value not greater than 1.5, and not less than unity of the z transform of the said sampled impulse response and for forming a filter having a sampled impulse-response with a z transform with first roots (zeros) and sets of second roots (zeros), the sets of second roots approximating to poles coinciding with the roots (zeros) represented by the quantities determined, the said filter being made all-pass by locating the first roots (zeros) at values of z which are the complex conjugate reciprocals of those of the said poles, and there being one root for each pole.

14. Apparatus according to claim 13 wherein the said means for automatically determining the said respective quantities, determines a quantity which is the negative reciprocal of a first root having a modulus greater than the said predetermined value, from the sampled impulse-response of the data transmission link and comprises means for taking each sample of the response in reverse sequence starting with the last significant sample, means for forming, in reversed order, a new sequence of samples by taking each sample in the reversed response in turn and subtracting the product of the previous sample in the new sequence (in reversed order), if any, times a current estimate of the said negative reciprocal, means for determining a new estimate of the said negative reciprocal by adding to the previous estimate a number proportional to the dividend obtained by dividing the final sample of the new sequence by a correction factor, and means for using the new estimate to repeat the above operation of the reversed impulse-response of the said link until the new estimate of the negative reciprocal is substantially the same as the previous estimate.

15. Apparatus according to claim 13 wherein the predetermined value is 1.3.

16. Apparatus according to claim 13 wherein said filter forming apparatus comprises means for taking samples of received data, means for successively delaying the samples by the sampling interval, means for multiplying each undelayed sample and the delayed samples by respective coefficients, and means for summing the resultant products, the said coefficients being determined in accordance with the negative complex-conjugate reciprocals and negative reciprocals of the roots found.

17. Apparatus according to claim 13 wherein the means for determining the respective quantities determines the said quantities sequentially.

18. Apparatus according to claim 13 wherein the filter forming means comprises transversal filter means arranged to determine in an iterative process from the said estimate applied at the input thereof, a value representative of one of the said roots having a modulus greater than the predetermined value, the transversal filter means, in operation, generating a modified sampled impulse response of the data transmission link with the said one root cancelled, the filter forming means being arranged to use the modified response and the transversal filter means in determining a value representative of another one of the said roots having a modulus greater than the predetermined value, to repeatedly obtain modified sampled impulse responses with all roots which have been determined cancelled, and to determine a value representative of another root until values representing, at least, most of the said roots having a modulus greater than the predetermined value have been determined.

19. Apparatus according to claim 14 wherein the correction factor is equal to:

$$\Sigma e_h(-\lambda)^{h-1}, \text{ from } h=1 \text{ to } h=g$$

where $e_h$ is the $h^{th}$ sample of the new sequence (in the correct, not reversed, order) and $\lambda$ is the current estimate of the said negative reciprocal.

20. Apparatus according to claim 14 wherein the said means for automatically determining the said respective quantities, after determining the negative reciprocal of the first root then determines the negative reciprocals, in turn, of further roots and comprises, for this purpose, means for deriving a modified sampled impulse response in which, in effect, roots whose negative reciprocals have been found are cancelled and substituted by roots which are at the complex conjugate reciprocals of the z values of the said roots, and means for using the modified response as the sampled impulse-response which is reversed in the procedure for finding the first root.

21. Apparatus according to claim 16 comprising means for finding the coefficients including means for taking, in turn, each signal of a sequence of signals equal in number to the number of the said coefficients required, the signals of the sequence initially all being zero except the last which is initially one, means for adding each signal to the product of the previous signal, if any, times the complex-conjugate of one of the negative reciprocals already found to form an intermediate sequence, means for reversing the order of the intermediate sequence, means for forming a further sequence by taking each signal in the reversed sequence, in turn, and substracting the product of the said one negative reciprocal times the previous signal, if any, in the further sequence, means for repeating the said steps using the negative complex-conjugate reciprocal and negative reciprocal of another root, and using the new sequence generated as the initial sequence for the first step until all roots previously determined have been used, the signals of the final further sequence found being the required coefficients.

22. Apparatus according to claim 18 wherein the filter forming means comprises further transversal filter means arranged to receive the modified sampled impulse responses from the other transversal filter and generate from each such response a further modified sampled impulse response of the data transmission link with each cancelled root replaced by one of the first roots, the filter forming means being arranged to apply each modified sampled impulse response to the said other transversal filter to determine a value representative of another root until the value for the last root required has been found.

23. Apparatus according to claim 20 wherein said means for deriving a modified sample response comprises means for obtaining each modified sampled response by taking, in turn and in sequential order, each sample of the sequence obtained when the final estimate of the negative reciprocal of a root is found and means for adding to said sample so obtained the product of the previous sample (if any) of the said sequence times the complex conjugate of the said final estimate.

24. Apparatus according to claim 20 in combination with
   means for sampling, at regular intervals, signals received over a data transmission link, and
   a detector,
   the filter forming apparatus being coupled between the sampling means and the detector.

25. Apparatus according to claim 24 wherein the filter forming apparatus, the sampling means and the detector are formed at least in part by a programmed computer.

26. Apparatus according to claim 24 wherein said means for deriving a modified sampled response comprises means for obtaining each modified sampled response by taking, in turn and in sequential order, each sample of the sequence obtained when the final estimate of the negative reciprocal of a root is found and means for adding to said sample so obtained the product of the previous sample (if any) of the said sequence times the complex conjugate of the said final estimate, wherein the detector is a maximum likelihood detector, the filter forming apparatus is connected to the input of the detector and the detector is arranged to employ, as an estimate of the sampled impulse-response of a data transmission link and the said filter, the final said modified sampled impulse-response determined when all roots greater than the predetermined value have been used in forming the said modified sampled impulse-responses.

27. Apparatus according to claim 24, wherein said means for deriving a modified sample response comprises means for obtaining each modified sampled response by taking, in turn and in sequential order, each sample of the sequence obtained when the final estimate of the negative reciprocal of a root is found and means for adding to said sample so obtained the product of the previous sample (if any) of the said sequence times the complex conjugate of the said final estimate, and the apparatus employes a non-linear equaliser formed by the filter forming apparatus, the said detector, a subtraction circuit, with one input connected to the output of the said filter and output connected to the input of the detector, and a further filter connected between the output of the detector and the other input of the subtraction circuit, the further filter having a sampled impulse-response which depends on the said modified sampled impulse-response determined when all roots greater than the predetermined value have been used in forming the said sampled impulse-response.

* * * * *